(12) United States Patent
Shankman

(10) Patent No.: US 10,450,020 B2
(45) Date of Patent: Oct. 22, 2019

(54) BICYCLE SEAT ASSEMBLY

(71) Applicant: Michael Shankman, Rishpon (IL)

(72) Inventor: Michael Shankman, Rishpon (IL)

(73) Assignee: Ino Vision Ltd., Herzliya (IL)

( * ) Notice: Subject to any disclaimer, the term of this patent is extended or adjusted under 35 U.S.C. 154(b) by 371 days.

(21) Appl. No.: 15/014,390

(22) Filed: Feb. 3, 2016

(65) Prior Publication Data

US 2017/0217520 A1 Aug. 3, 2017

(51) Int. Cl.
*B62H 5/00* (2006.01)
*B62J 1/08* (2006.01)

(52) U.S. Cl.
CPC ............. *B62H 5/006* (2013.01); *B62J 1/08* (2013.01); *B62K 2206/00* (2013.01)

(58) Field of Classification Search
None
See application file for complete search history.

(56) References Cited

U.S. PATENT DOCUMENTS

| | | | | |
|---|---|---|---|---|
| 5,007,675 A | * | 4/1991 | Musto | B62J 1/08 |
| | | | | 297/215.14 |
| 5,709,430 A | * | 1/1998 | Peters | B62J 1/002 |
| | | | | 297/201 |
| 7,581,787 B2 | * | 9/2009 | Livne | B62H 5/00 |
| | | | | 297/201 |
| D663,540 S | * | 7/2012 | Livne | D6/354 |
| 8,534,754 B2 | * | 9/2013 | Livne | B62H 5/00 |
| | | | | 297/118 |
| D705,038 S | * | 5/2014 | Stevens | D8/333 |
| 8,939,000 B2 | * | 1/2015 | Mendyk | B62H 5/006 |
| | | | | 297/195.1 |
| 2004/0145147 A1 | * | 7/2004 | Asbury | B62K 13/02 |
| | | | | 280/204 |
| 2007/0046081 A1 | * | 3/2007 | Shook | B62J 1/08 |
| | | | | 297/195.1 |
| 2008/0309130 A1 | * | 12/2008 | Livne | B62H 5/00 |
| | | | | 297/215.1 |
| 2010/0187868 A1 | * | 7/2010 | Livne | B62H 5/00 |
| | | | | 297/129 |
| 2011/0168471 A1 | * | 7/2011 | Duignan | B62M 6/35 |
| | | | | 180/205.7 |

* cited by examiner

*Primary Examiner* — David E Allred
(74) *Attorney, Agent, or Firm* — Dekel Patent Ltd.; David Klein

(57) ABSTRACT

A bicycle seat assembly includes a mounting platform that includes one or more bicycle seat post attachment members and a receiving member for receiving thereon or therein a portion of a bicycle seat. The mounting platform includes a quick release locking mechanism, which includes a lever attached to a bolt, which is assembled to a locking lug arranged to move and lock against a locking surface formed in the portion of the bicycle seat.

10 Claims, 5 Drawing Sheets

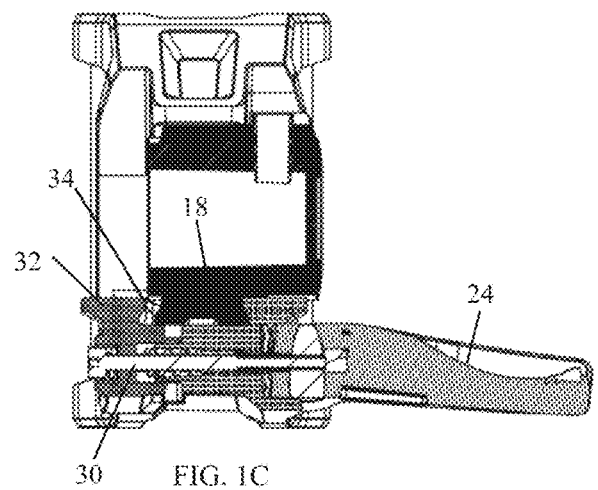
FIG. 1C
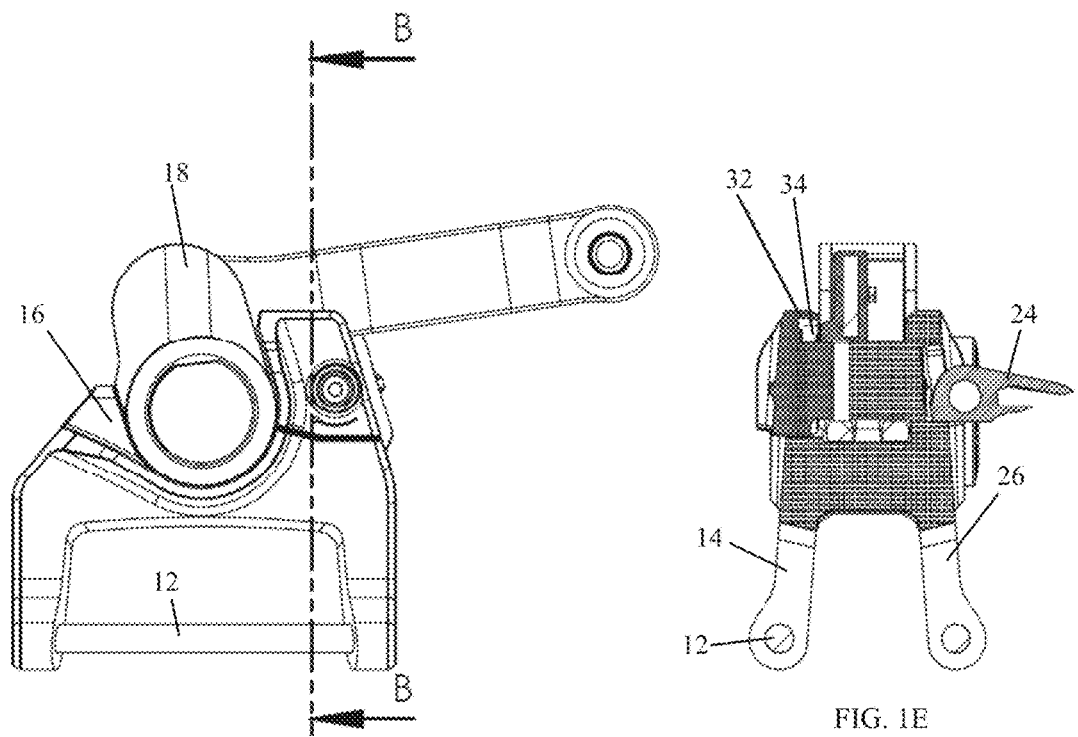
FIG. 1D
FIG. 1E

BICYCLE SEAT ASSEMBLY

FIELD OF THE INVENTION

This invention relates generally to bicycle seats. The bicycle seat may also double as a bicycle lock.

BACKGROUND OF THE INVENTION

There is a major problem of bicycle theft in general, and particularly theft of bicycle seats. Although many bicycle locks are manufactured and marketed, bicycle locks are generally useless in preventing theft of the bicycle seat.

U.S. Pat. No. 8,534,754 to Livne (assigned to InoVision Ltd.) describes a bicycle seat that doubles as a bicycle lock. The bicycle apparatus includes a bicycle seat support member, locking members mechanically linked to the bicycle seat support member, and a lock that locks the locking members to each other. In a first position, the bicycle seat support member is secured to a bicycle seat post of a bicycle for use as a bicycle seat support. In a second position, the bicycle seat support member is arranged for locking the bicycle by being locked with the locking members and the lock.

SUMMARY OF THE INVENTION

The present invention seeks to provide a novel bicycle seat, which attaches to a mounting platform by means of a quick release fastener. The platform has a pair of rails that are mounted on a bicycle seat post, for example, just like standard rails on the underside of a bicycle seat are mounted on the bicycle seat post. The bicycle seat may also double as a bicycle lock.

The present invention solves the problem of the bicycle seat theft in two ways. In one method, the bicycle seat is easily removed from the bicycle and can be safely carried in the rider's backpack and the like. In another method, the bicycle seat doubles as a bicycle lock; the seat itself is used to safely lock the bicycle to the bicycle itself or to an external object to prevent theft of the bicycle and its seat.

There is thus provided in accordance with an embodiment of the invention a mounting platform that includes one or more bicycle seat post attachment members and a receiving member for receiving thereon or therein a portion of a bicycle seat. The mounting platform includes a quick release locking mechanism, which includes a lever attached to a bolt, which is assembled to a locking lug arranged to move and lock against a locking surface formed in the portion of the bicycle seat.

In accordance with non-limiting embodiments of the invention, a locking assembly is attached to the bicycle seat.

BRIEF DESCRIPTION OF THE DRAWINGS

The present invention will be understood and appreciated more fully from the following detailed description taken in conjunction with the drawings in which:

FIGS. 1A-1E are simplified illustrations of a mounting platform, in accordance with an embodiment of the invention, wherein FIG. 1A is a perspective illustration, FIG. 1B is an end view, FIG. 1C is a sectional illustration taken along lines A-A in FIG. 1B, FIG. 1D is a side view, and FIG. 1E is a sectional illustration taken along lines B-B in FIG. 1D;

DETAILED DESCRIPTION OF EMBODIMENTS

Figure 1A:
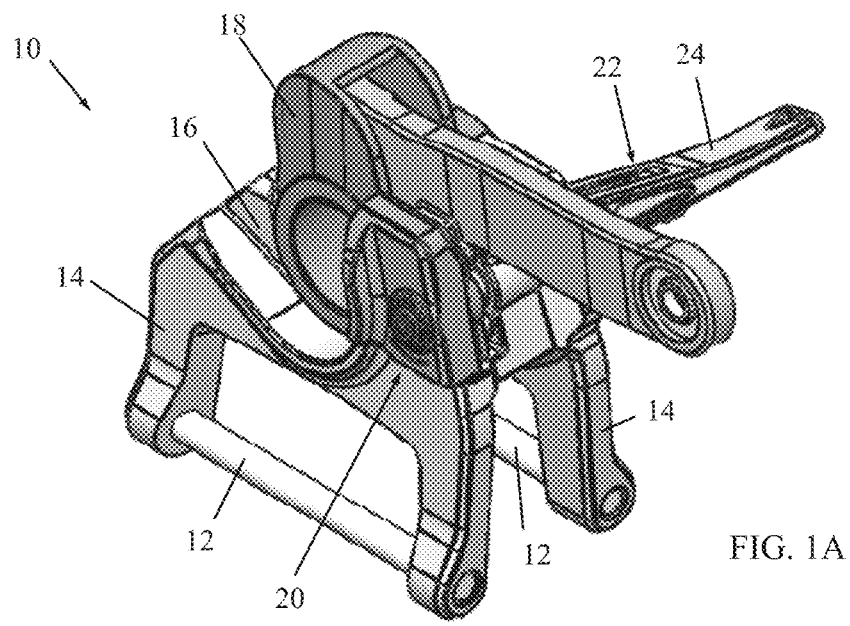

Reference is now made to FIGS. 1A-1E, which illustrate a mounting platform 10 for mounting thereon a bicycle seat assembly, constructed and operative in accordance with a non-limiting embodiment of the present invention.

The mounting platform 10 includes one or more bicycle seat post attachment members 12, which in the illustrated embodiment are a pair of rails 12 attached to side extensions 14. The mounting platform 10 includes a receiving member 16 for receiving thereon or therein a portion 18 of a bicycle seat, which in the illustrated embodiment, is a portion of a locking member 18, described more in detail hereinbelow. The receiving member 16 may be curved to complement the shape of this portion 18 of the bicycle seat.

Figure 1B:
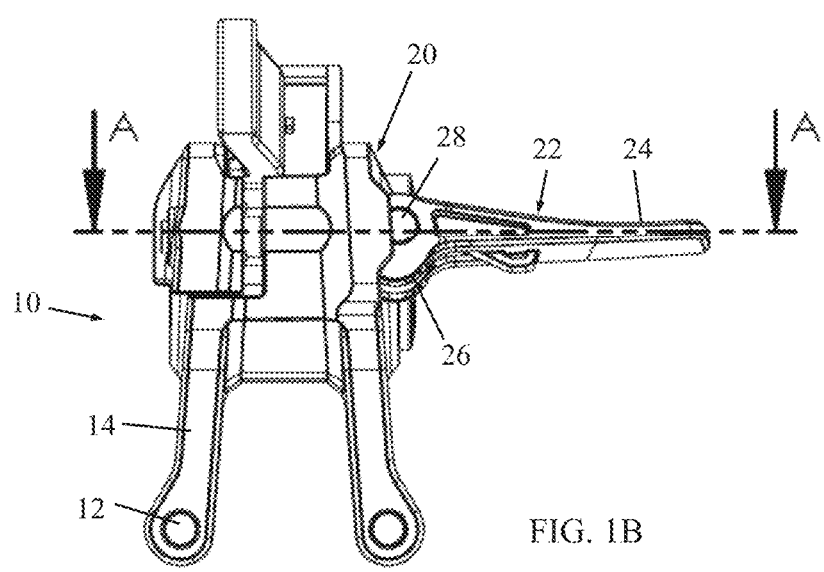

The mounting platform 10 includes a quick release locking mechanism 20, including and operated by, a quick release fastener 22. As is known in the art, quick release fastener 22 includes a lever 24 that has a cam 26 that pivots about a pivot 28 (FIG. 1B). Lever 24 is attached to a bolt 30, which is assembled to a locking lug 32 arranged to move and lock against a locking surface 34 (e.g., notch, groove, inclined surface, etc.) formed in the portion 18 of the bicycle seat (FIG. 8C). Pivoting the lever 24 towards the body of mounting platform 10 (downwards in the sense of FIG. 8A) pulls bolt 30 to a tightened position (that is, locking lug 32 moves towards and locks against locking surface 34). Conversely, pivoting lever 24 away from the body of mounting platform 10 (upwards in the sense of FIG. 8A) pushes bolt 30 to an untightened (released) position.

It is noted that lever 24 has a relatively long circular motion between the tightened and released positions, whereas bolt 30 has a relatively short linear motion between these positions.

Figure 2:
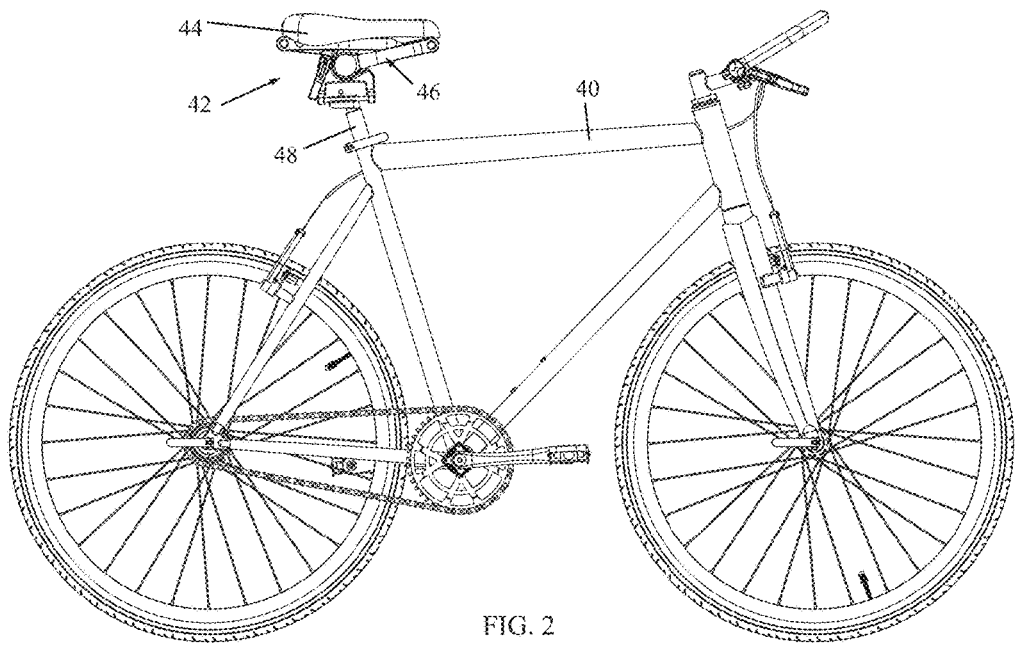
FIG. 2 is a simplified side-view illustration of a bicycle with a bicycle seat assembly, including a combination bicycle seat and bicycle lock mounted on the mounting platform attached to a bicycle seat post, constructed and operative in accordance with a non-limiting embodiment of the present invention.
Figure 2A:
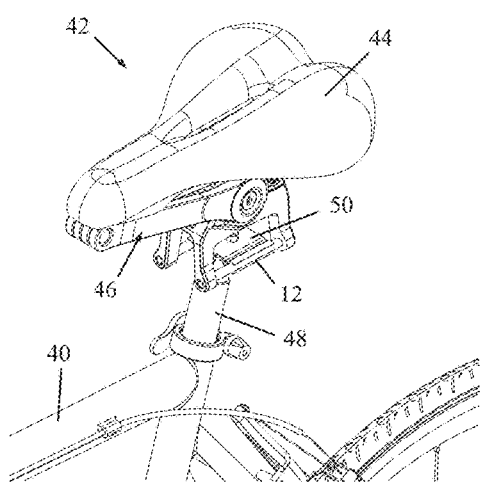
FIGS. 2A and 2B are left and right perspective illustrations, respectively, of the bicycle seat assembly mounted on the bicycle.
Figure 2B:
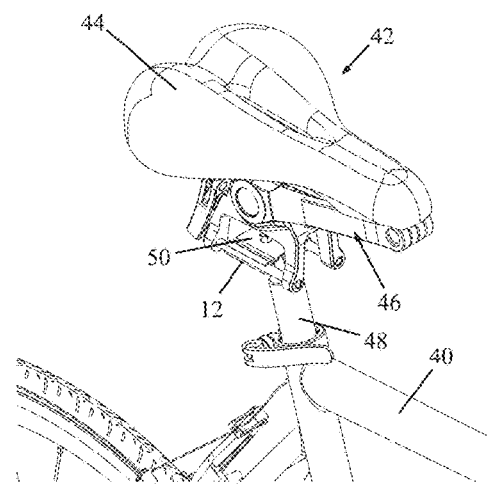

Reference is now made to FIG. 2, which illustrates a bicycle 40 with a bicycle seat assembly 42. The bicycle seat assembly 42 is a combination of a bicycle seat 44 and bicycle locking assembly 46 mounted on the mounting platform 10 attached to a bicycle seat post 48. As seen in FIGS. 2A and 2B, the rails 12 are clamped or otherwise attached to clamp members 50 of bicycle seat post 48.

Figure 3:
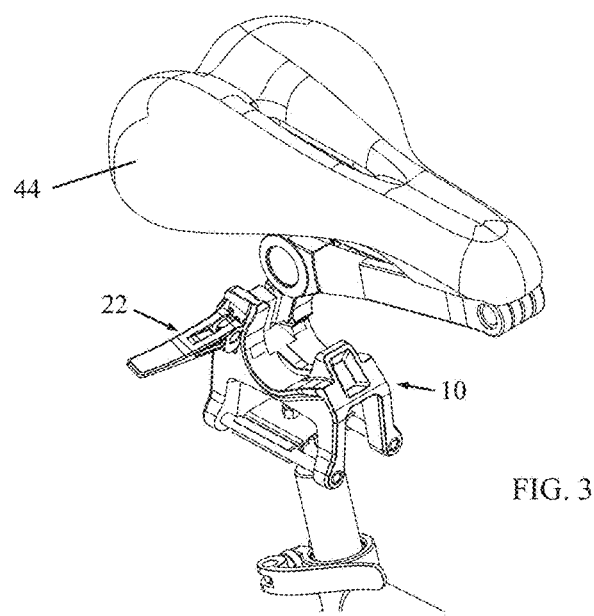
FIG. 3 is a simplified illustration of releasing the bicycle seat from the mounting platform by means of a quick release fastener.

FIG. 3 illustrates releasing bicycle seat 44 from mounting platform 10 by means of quick release fastener 22.

Figure 4:
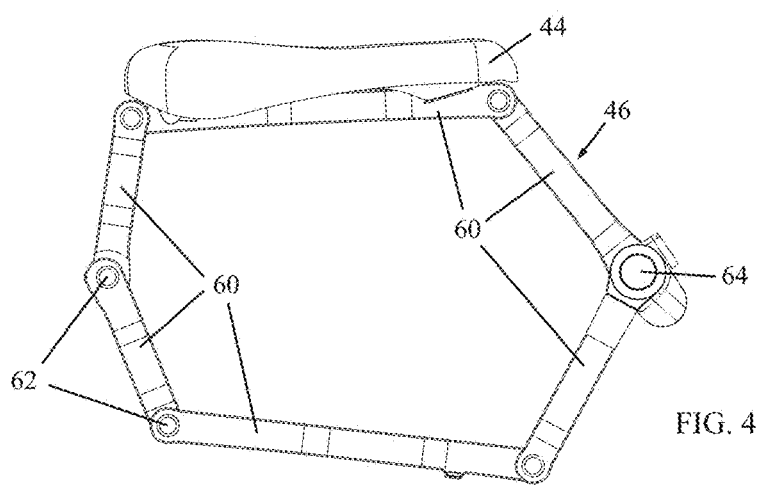
FIGS. 4 and 5 are simplified illustrations of the bicycle seat with locking members in an unfolded position, and respectively locked and unlocked, in accordance with an embodiment of the present invention.
Figure 5:
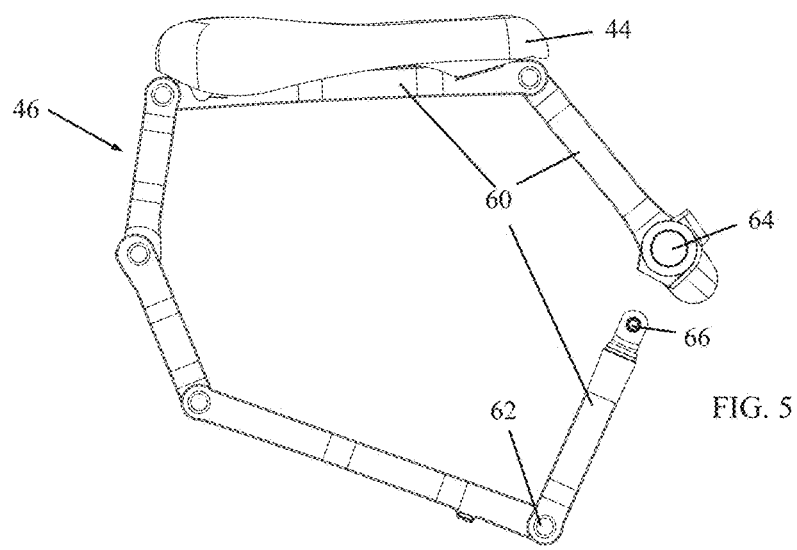

FIGS. 4 and 5 illustrate bicycle seat 44 with a locking assembly 46. The locking assembly 46 includes a plurality of locking members 60, which are pivotally connected to one another by pivot links 62. In the illustrated embodiment, there are a total of six (6) locking members 60, but the embodiment is not limited to this number, and the embodiment can have just two locking members 60 or more than 6. Locking members 60 are preferably made of a steel alloy, hardened against cutting or other vandalistic forces (or any other suitable material). One of the locking members 60 may be fixedly or pivotally secured to the underside of bicycle seat 44. Another of the locking members 60 may be connected to a locking device, such as a lock 64, which may be a cylinder lock operated by a key (not shown) or may be another type of lock, such as but not limited to, a combination lock or RFID lock. Opening the lock 64 releases a lock insert member 66 (FIG. 5) mounted on the end of one of the locking members 60, so as to permit unfolding and stretching out the locking members 60. FIG. 4 illustrates the locked position, wherein the lock insert member has been re-inserted and locked into lock 64.

Figure 6:
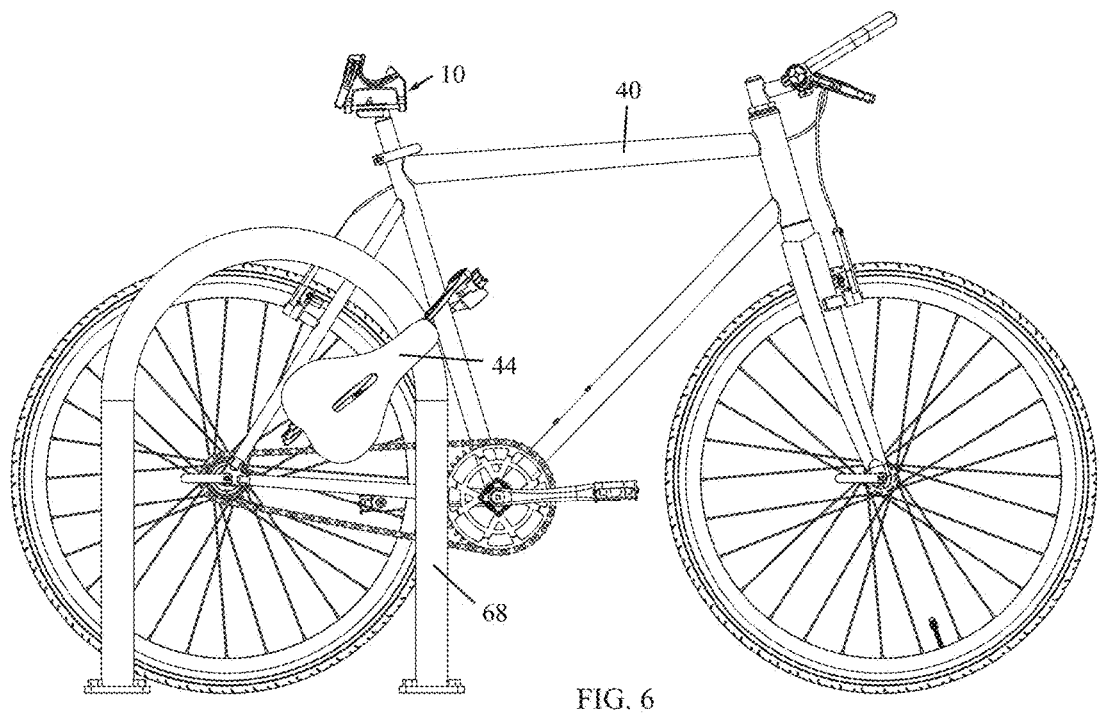
FIG. 6 is a simplified illustration of the bicycle seat being used as a lock to lock a bicycle to an object, in accordance with an embodiment of the present invention.
Figure 7:
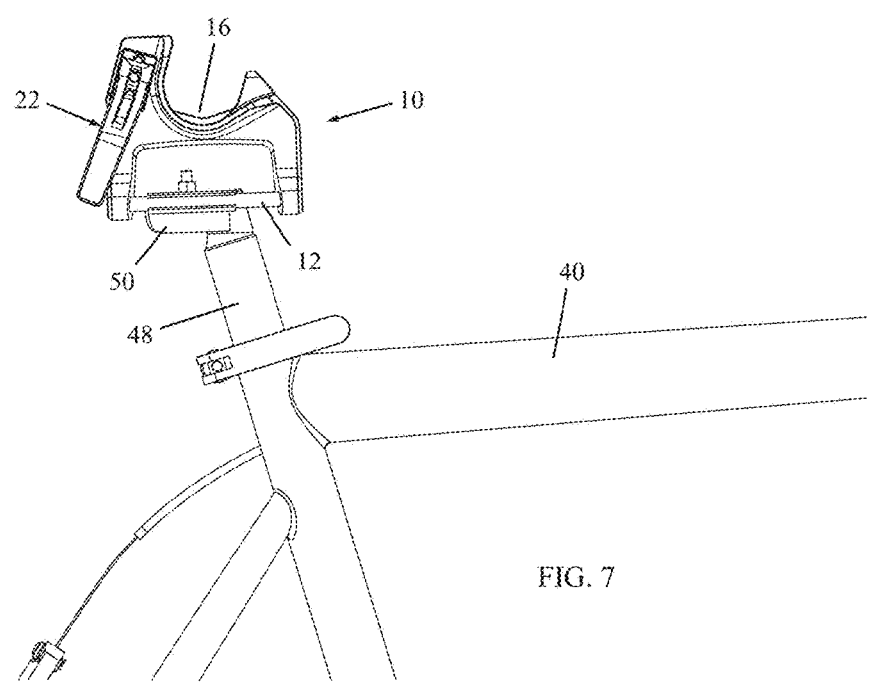
FIG. 7 is a simplified illustration of the mounting platform without the bicycle seat attached thereto.

Reference is now made to FIG. 6, which illustrates the bicycle seat 44 being used as a lock to lock bicycle 40 to an object 68 (such as a bicycle stand). FIG. 7 illustrates the mounting platform 10 without the bicycle seat attached thereto.

What is claimed is:

1. A bicycle comprising:
   a bicycle seat and a bicycle seat post;
   a mounting platform comprising, on a lower portion thereof, one or more bicycle seat post attachment members attached to said bicycle seat post with a first clamping means; and
   wherein said bicycle seat is affixed to said mounting platform with a second clamping means which is independent and separate from said first clamping means, said second clamping means comprising a quick release locking mechanism, including and operated by, a quick release fastener which comprises a lever that has a cam that pivots about a pivot, wherein said lever is attached to a bolt, which is assembled to a locking lug arranged to move and lock against a locking surface formed in said bicycle seat; and
   wherein said mounting platform comprises a receiving member for receiving thereon a portion of said bicycle seat, said receiving member defining at least one upwardly concave surface formed on an upper portion of said mounting platform, said at least one upwardly concave surface extending from a rear portion of said mounting platform to a front portion of said mounting platform, said rear portion extending above said portion of said bicycle seat and said front portion being lower than said rear portion and not extending above said portion of said bicycle seat.

2. The bicycle according to claim 1, wherein said one or more bicycle seat post attachment members comprise a pair of rails attached to side extensions, and wherein said rails are clamped or otherwise attached to clamp members of said bicycle seat post.

3. The bicycle according to claim 1, wherein said bicycle seat comprises a locking assembly.

4. The bicycle according to claim 3, wherein said locking assembly comprises a plurality of locking members, which are pivotally connected to one another by pivot links.

5. The bicycle according to claim 2, wherein said at least one upwardly concave surface comprises two upwardly concave surfaces each of which is opposite one of said rails.

6. The bicycle according to claim 5, wherein said front portion of said mounting platform comprises a central protrusion positioned between, and extending above, said two upwardly concave surfaces and configured to abut against said portion of said bicycle seat.

7. A bicycle accessory for a bicycle that includes a bicycle seat and a bicycle seat post, said bicycle accessory comprising:
   a mounting platform comprising, on a lower portion thereof, one or more bicycle seat post attachment members attachable to said bicycle seat post with a first clamping means;
   a second clamping means which is independent and separate from said first clamping means, said second clamping means comprising a quick release locking mechanism, including and operated by, a quick release fastener which comprises a lever that has a cam that pivots about a pivot, wherein said lever is attached to a bolt, which is assembled to a locking lug arranged to move and lock against a locking surface formed in said bicycle seat; and
   wherein said mounting platform comprises a receiving member for receiving thereon a portion of said bicycle seat, said receiving member defining at least one upwardly concave surface formed on an upper portion of said mounting platform, said at least one upwardly concave surface extending from a rear portion of said mounting platform to a front portion of said mounting platform, said rear portion extending above said portion of said bicycle seat and said front portion being lower than said rear portion and not extending above said portion of said bicycle seat.

8. The bicycle accessory according to claim 7, wherein said one or more bicycle seat post attachment members comprise a pair of rails attached to side extensions.

9. The bicycle accessory according to claim 8, wherein said at least one upwardly concave surface comprises two upwardly concave surfaces each of which is opposite one of said rails.

10. The bicycle accessory according to claim 9, wherein said front portion of said mounting platform comprises a central protrusion positioned between, and extending above, said two upwardly concave surfaces and configured to abut against said portion of said bicycle seat.

* * * * *